United States Patent [19]
Mott

[11] Patent Number: 5,507,467
[45] Date of Patent: Apr. 16, 1996

[54] ACTUATOR FOR A DRILL STRING INTERNAL BLOWOUT PREVENTER

[75] Inventor: Keith C. Mott, Houston, Tex.

[73] Assignee: Hydril Company, Houston, Tex.

[21] Appl. No.: 116,456

[22] Filed: Sep. 3, 1993

[51] Int. Cl.[6] ................ F16K 31/163; F16K 31/122
[52] U.S. Cl. ................ 251/58; 166/319; 175/218; 251/62
[58] Field of Search .............. 251/58, 62; 92/138, 92/140; 166/319; 175/218; 137/580

[56] References Cited

U.S. PATENT DOCUMENTS

| | | | |
|---|---|---|---|
| 3,253,518 | 5/1966 | Duemler | 92/138 |
| 3,298,286 | 1/1967 | Tyler | 92/140 |
| 3,509,913 | 5/1970 | Lewis | 251/58 |
| 3,737,142 | 6/1973 | Boswell et al. | 251/58 |
| 3,806,082 | 4/1974 | Kellner | 251/58 |
| 3,887,161 | 6/1975 | Kubelka, Jr. | 251/58 |
| 3,941,348 | 3/1976 | Mott | 251/58 |
| 4,316,596 | 2/1982 | Krober et al. | 251/58 |
| 4,456,217 | 6/1984 | Wingeart | 166/319 |
| 4,576,358 | 3/1986 | Mott et al. | 251/58 |
| 4,700,924 | 10/1987 | Nelson et al. | 251/58 |
| 4,795,128 | 1/1989 | Krasnov et al. | 175/218 |

*Primary Examiner*—George L. Walton
*Attorney, Agent, or Firm*—Vaden, Eickenroht, Thompson & Feather

[57] ABSTRACT

A remotely operated actuator for a drill string internal blowout preventer is disclosed. It includes an annular cylinder for mounting on the preventer housing to rotate with the housing and the kelly. An annular piston in the cylinder moves a link pivotally connected to the piston and a crank arm to open and close the preventer.

8 Claims, 4 Drawing Sheets

ACTUATOR FOR A DRILL STRING INTERNAL BLOWOUT PREVENTER

This invention relates to actuators for opening and closing internal blowout preventers in drill strings generally, and in particular to such actuators that can be remotely operated.

Drill string internal blowout preventers previously called kelly safety valves or kelly cocks, are usually located between the swivel and the kelly in the drill string of a rotary drilling rig. The kelly is a non-circular tubular member in the drill string that extends through a non-circular opening in the drive bushing of a rotary table that rotates the bushing and the kelly and in doing so, rotates the drill string.

If a power swivel is used, the kelly is not needed. Here the drill string internal blowout preventer, hereinafter called "IBOP" or "preventer" is located between the output shaft of the power swivel and the drill string.

Various types of remotely actuated IBOP actuators have been proposed and/or used in the past. All employ one or more pneumatic or hydraulic cylinders to provide the power to close the IBOP. In all cases, the power cylinders do not rotate with the drill string making it necessary to provide some arrangement for transmitting power from the stationary cylinders to the rotating IBOP. For example, the two most pertinent prior art patents of which applicant is aware are Mott U.S. Pat. No. 3,941,348 and Winegeart U.S. Pat. No. 4,650,153. The Mott '348 patent uses a plurality of hydraulic cylinders to provide the power to close and open the IBOP. The cylinders are arranged vertically around the IBOP housing to move an annular ring attached to the ends of the piston rods up and down in a path parallel to the longitudinal axis of the drill string. The cylinders do not rotate with the drill string. The annular ring has an annular groove in which rollers attached to the ends of the piston rods are positioned to allow the annular ring to rotate relative to the hydraulic cylinders. With this arrangement, the hydraulic cylinders can move the rotating annular ring longitudinally and cause a rack attached to the annular ring to rotate a pinion mounted on the crankshaft of the IBOP to close or open the preventer.

In the Winegeart '153 patent, two arrangements for transferring power from the non-rotating hydraulic cylinders to the crankshaft of the preventer are described. One is very similar to that of the '348 patent in that a plurality of stationary hydraulic cylinders are used. The crank arm that rotates the crankshaft and the valve element of the preventer has a cam at one end that rolls in an annular groove in the side of an annular member that is moved up and down by the hydraulic cylinders in a manner similar to that of the Mott patent. This movement is transmitted through the cam or the roller to the crank arm to open and close the preventer. In another embodiment, a rack and pinion arrangement is used to open and close the preventer. In this embodiment, a stationary annular piston and cylinder provide the power.

It is an object of this invention to provide a very simple, preferably pneumatically operated actuator for an internal blowout preventer for a drill string that opens and closes the preventer by moving an annular piston in an annular cylinder that surrounds and rotates with the drill string with the movement of the annular piston being transmitted to a crank arm through a link pivotally connected to the piston and the crank arm to rotate the crank arm and open and close the preventers.

It is a further object and feature of this invention to provide such a link between the crank arm and the piston that moves the crank arm approximately 90° to open and close the preventer with the crank arm extending from the crankshaft at an angle of approximately 45° from the horizontal plane when the preventer is in either the open or closed position and at approximately 45° above the horizontal when the preventer is in the other position so that the component urging the crank arm to rotate is never less than $0.707F$ where $F$ is the force exerted by the piston on the crank arm.

It is a further object and feature of this invention to provide such an actuator with a link that is kidney-shaped and bows away from the crankshaft of the preventer so that it can have the maximum width for strength purposes and yet be as close as possible to the crankshaft as it moves the crankshaft through 90° of rotation to open and close the preventer.

These and other objects, advantages, and features of this invention will be apparent to those skilled in the art from a consideration of this specification including the attached drawings and appended claims.

Figure 1:
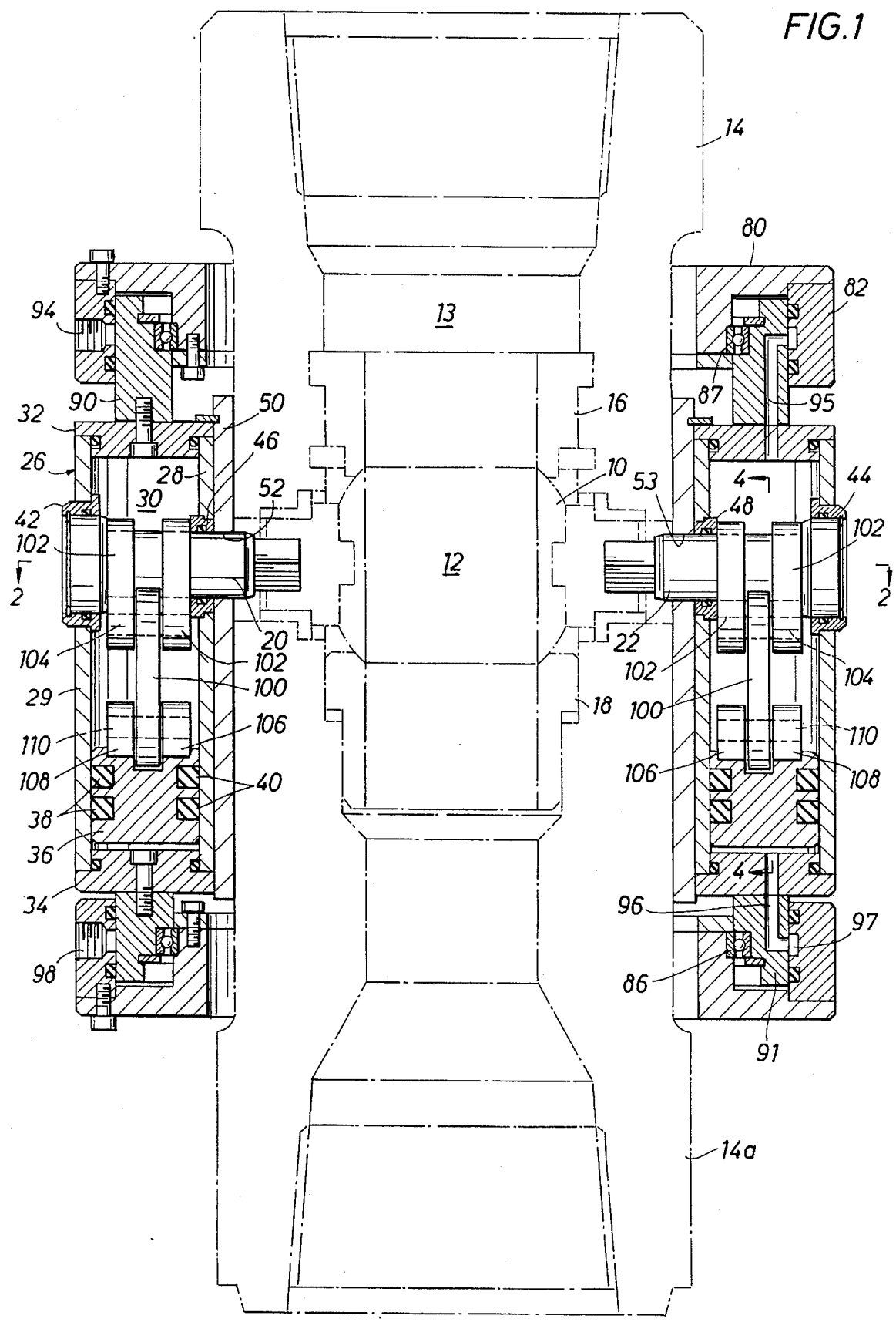
FIG. 1 is a vertical sectional view through the preferred embodiment of the actuator of this invention showing the actuator mounted on the housing of a drill string internal blowout preventer of the ball valve type.

In FIG. 1, the internal blowout preventer is shown in phantom lines. The preventer includes ball-shaped valve element 10 having opening 12 that is shown in axial alignment with flow passage 13 through preventer housing 14. Annular valve seats 16 and 18, located on each side of the valve element, support the valve element for rotation by crankshafts 20 and 22 to rotate opening 12 to a position 90° from the open position shown in FIG. 1 so that opening 12 will be closed to flow passage 13 by valve seats 16 and 18 and prevent the flow of fluid upwardly or downwardly through the preventer. In most cases, the preventer is going to be used to prevent the fluid in the drill string from flowing upwardly through the drill string toward the swivel.

The actuator includes annular cylinder 26. The cylinder includes inner cylindrical wall 28 and outer cylindrical wall 29 that are spaced apart to provide annular chamber 30. Upper annular cap 32, and lower annular cap 34, close the ends of chamber 30. Annular piston 36 is located in the cylinder and provided with outer seals 38 and inner seals 40 so that fluid pressure below the piston will cause the piston to move upwardly relative to the chamber and pressure above the piston will cause the piston to move downwardly relative to the chamber.

Crankshafts 20 and 22 are located on opposite sides of the annular cylinder and extend through the cylinder wall in axial alignment with each other and with valve element 12. Both shafts are supported for rotation around their longitudinal axis by outer glands 42 and 44 located in outer cylinder wall 29 and inner glands 46 and 48 located in inner cylinder wall 28. O-rings carried by the glands prevent fluid in the cylinder from escaping.

Figure 3:
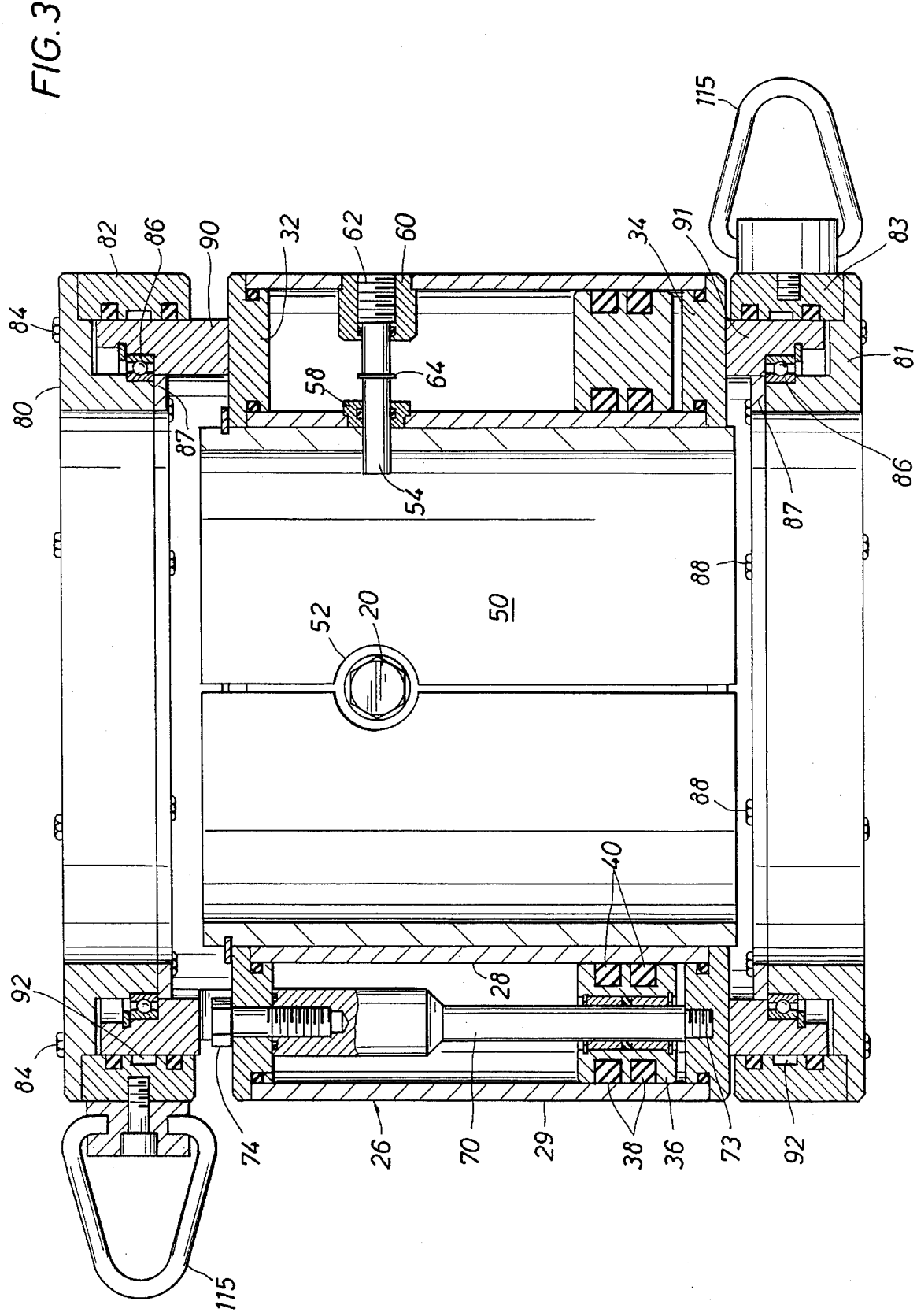
FIG. 3 is a sectional view taken along line 3—3 of FIG. 2.

Located between inner cylinder wall 28 and the preventer housing is split sleeve 50. As shown in FIG. 3, the sleeve is split vertically and provided with openings 52 and 53 through which the crankshafts extend. The split sleeve acts as a shim to fill the annular space between the middle section of the preventer housing and the cylinder that results because the cylinder has to have an internal diameter large enough to slip over the enlarged end 14a of the preventer housing.

Figure 2:
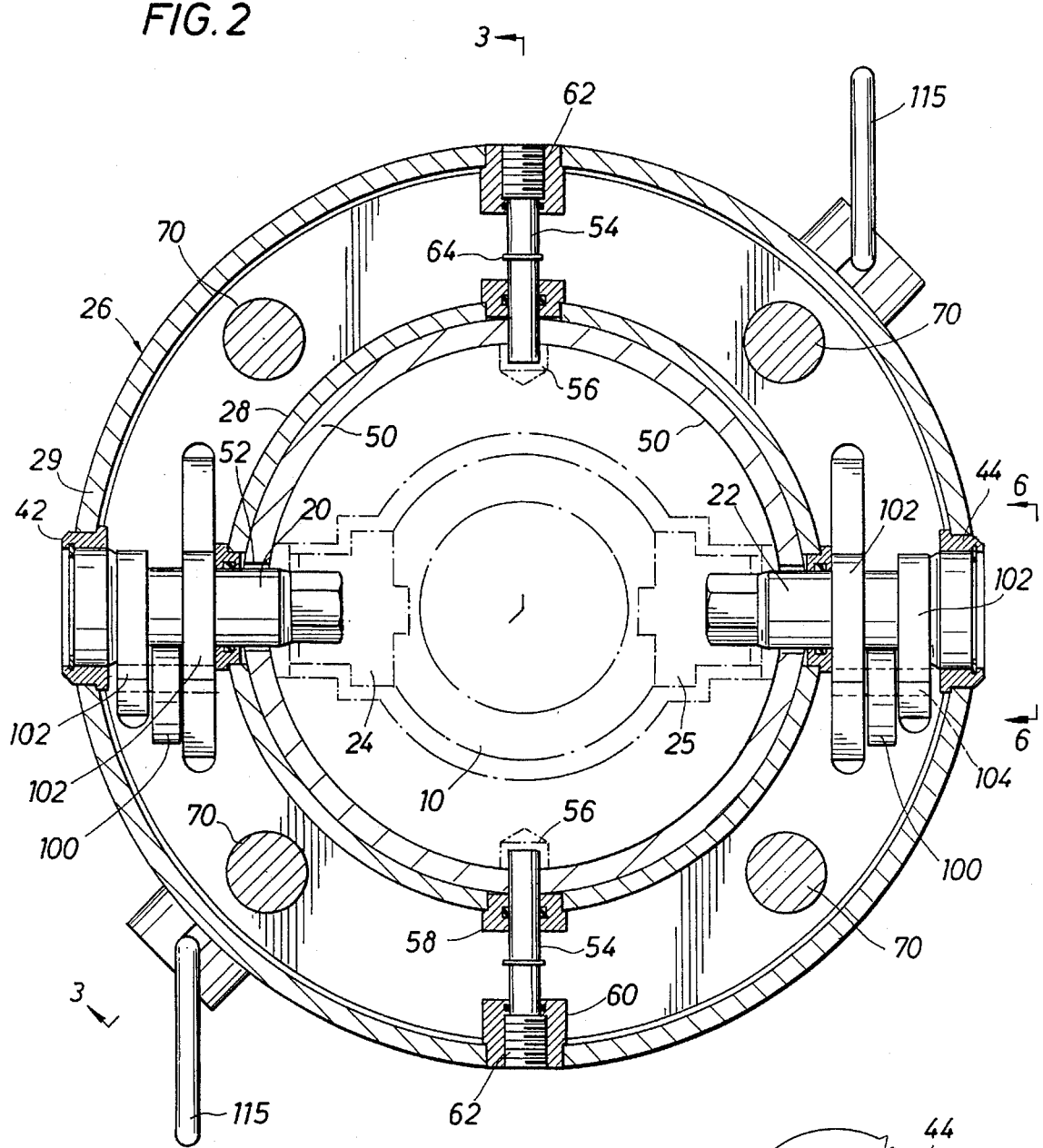
FIG. 2 is a sectional view taken along line 2—2 of FIG. 1.
Figure 6:
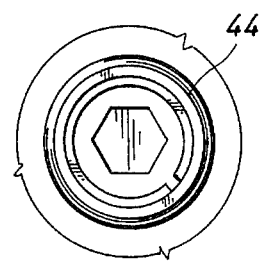
FIG. 6 is a view looking in the direction 6—6, showing the hex socket in the end of the crankshaft into which a wrench can be inserted to manually open or close the preventer should that be necessary.

The preventer is held in position on housing 14 by pins 54. As shown in FIG. 2, two such pins on opposite sides of the split sleeve extend through both the inner and outer walls of the cylinder through an opening in the split sleeve and engage blind holes 56 drilled in the housing of the preventer. Inner pin glands 58 and outer pin glands 60 are provided with O-rings that engage the pin and prevent fluid from leaking out of the cylinder through the openings in which the pins are located. Outer gland 60 has threads 62 that engage corresponding threads on the pins to hold the pins in position extending through the walls of the cylinder and through split sleeve 50. Snap ring 64 is located on each pin to limit the distance the pin can be moved outwardly which, of course, is necessary when the actuator is being removed from the preventer.

As shown in FIGS. 2 and 3, tie rods 70, four of which are used in this embodiment, extend between upper cylinder cap 32 to lower cylindrical cap 34 where the lower end of the tie rod is connected to the lower cap by threads 73. The upper end of tie rod 70 is connected to the upper cap by cap screw 74. The tie rods not only hold the upper and lower cylindrical caps in position but they also extend through piston 36 and prevent the piston from rotating relative to the cylinder. As will be discussed below, this is a necessary feature of the actuator due to the type of motion the piston provides to open and close the preventer.

The piston cylinder assembly rotates with the preventer. Operating fluid is provided to the rotating cylinder to move the piston by upper and lower stator assemblies. The two stators assemblies are structurally the same. One is just upside down relative to the other. Both include inner stators 80 and 81 and outer stators 82 and 83. Inner and outer stators are connected together by cap screw 84 and the assembly is mounted on bearings 86 and held in place by stator bearing retainer ring 87. The retainer ring in turn is attached to the stator assembly by cap screws 88. Bearings 86 are positioned between the stator assemblies and upper rotator 90 and lower rotator 91 that rotate with the cylinder. Lifting eyes 115 that are attached to both stators are held from rotation and in turn the stators are held against rotation by chains or cables attached between the lifting eyes and the swivel housing.

Figure 4:
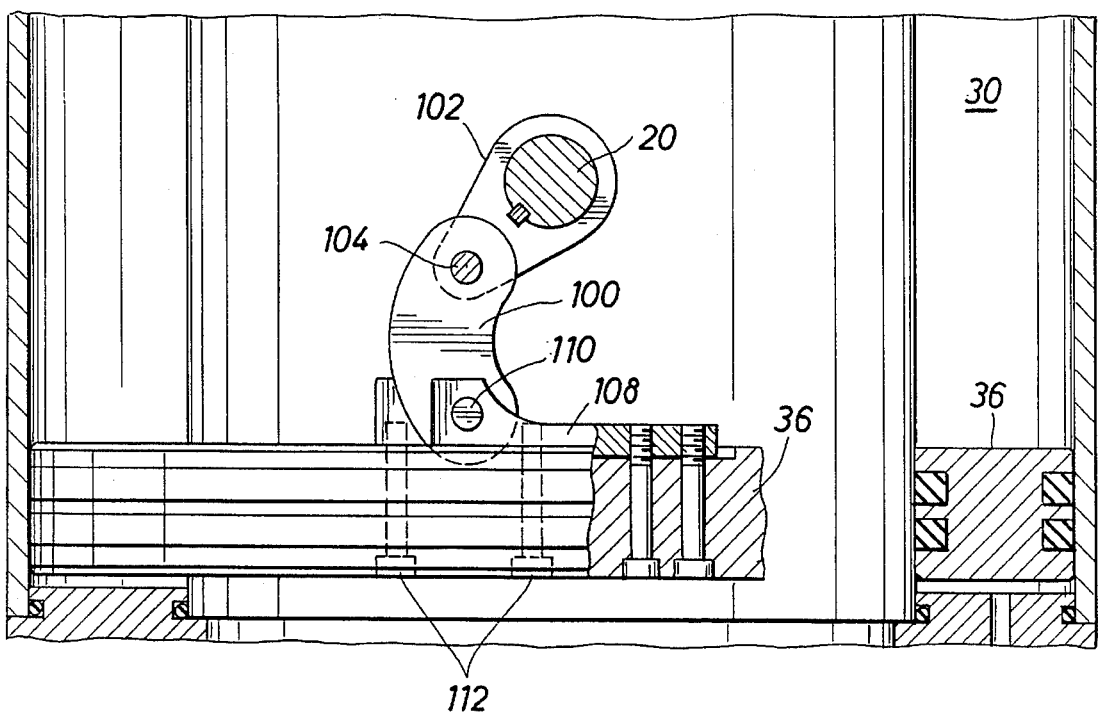
FIG. 4 is a side view of the piston, one of the crank arms, and one of the kidney-shaped links connecting the piston to the crank arms when the preventer is in its open position.
Figure 5:
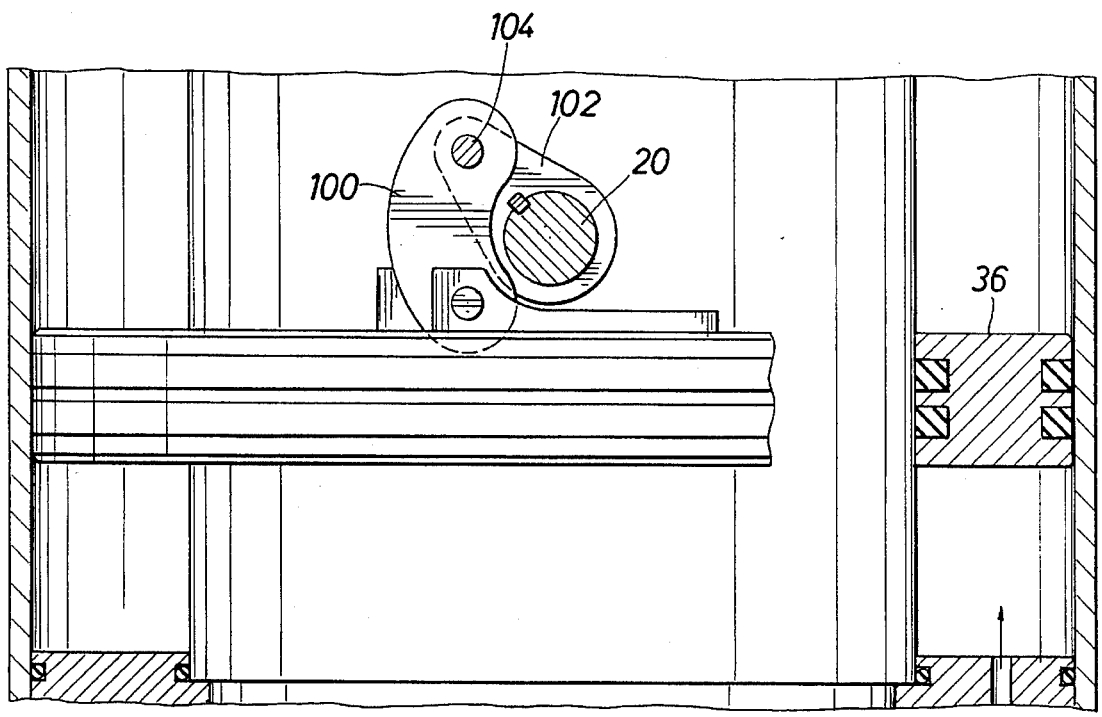
FIG. 5 is the same view as FIG. 4 showing the position of the link, the crank arm, and the piston when the link and piston have rotated the crank arm approximately 90° to close the preventer.

Outer stator members have annular grooves 92 that, as shown in FIG. 1, allow air injected into the annular groove through port 94 to flow through passage 95 in the rotator 90 into the upper end of cylinder 30. At the same time, the air below the piston escapes through passageway 96 in the lower rotator flowing through annular groove 97 and out port 98. As shown, of course, with the piston in the lower end of the cylinder, and the valve in the open position, the initial operation would be to provide air pressure through port 98 in the lower stator which, in turn, would force piston 36 upwardly with the air above the piston exhausting through port 94. FIGS. 4 and 5 show what occurs when the piston is so moved.

As shown in FIG. 4, link 100 is connected to crank arm 102 attached to the outer end of crankshaft 20. As shown in FIG. 1, there are actually a pair of crank arms on each crankshaft with a link in between. The links are connected to the crank arms by pins 104 so the links can pivot relative to the crank arms. The other ends of the links are connected to piston 36 by inner pad eyes 106 and outer pad eyes 108 and pin 110. The links can rotate relative to the pad eyes around pin 110. The pad eyes are attached to the upper side of piston 36 by machine bolts 112.

Upward movement of the piston will cause link 100 to rotate crank arm 102 approximately 90° from the open position shown in FIG. 4 to the closed position shown in FIG. 5. To accomplish this, the crank arm in FIG. 4 extends from crankshaft 20 at a downwardly inclined angle of about 45° when the preventer is in the open position and upwardly at an angle of about 45°, as shown in FIG. 5, when the preventer is in the closed position. This insures that the minimum component of the total force, F exerted on pin 104 urging the crank arm to rotate is 0.707F.

Link 100 is kidney-shaped, as shown, to allow the link and the crank arm to be as short as possible. Being curved away from the crankshaft, the link can move the crank arm 90° without hitting the crankshaft while maintaining the width required to withstand the forces involved. The links are located on the same side of the crankshafts so that any force exerted on the piston urging it to rotate by one link is balanced by the same but opposite force exerted on the piston by the other link.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A remotely operated actuator for a drill string internal blowout preventer having a valve element and a laterally extending crankshaft for rotating the valve element between an open and closed position comprising an annular cylinder mounted on and encircling the preventer for rotation with the preventer with the crankshaft extending into the cylinder, a crank arm located in the cylinder and attached to the crankshaft for rotating the shaft to move the valve element between open and closed positions, an annular piston in the cylinder, a link, located in the cylinder, having one end pivotally connected to the piston and the other end pivotally connected to the crank arm so that movement of the piston in one direction causes the link to rotate the crank arm within the cylinder and open the preventer and movement in the other direction causes the link to rotate the crank arm within the cylinder and close the preventer, and means to supply the cylinder with pressure fluid to move the piston in the desired direction to open and close the preventer.

2. The actuator of claim 1 in which the means for supplying fluid pressure to the cylinder includes non-rotating cylinder heads mounted on opposite ends of the cylinder to supply the cylinder with pressure fluid on one side of the piston while exhausting fluid from the cylinder on the other side of the piston.

3. The actuator of claim 1 in which the link is kidney-shaped.

4. The actuator of claims 1, 2, or 3 further provided with a second crankshaft located in axial alignment with the first crankshaft and connected to the valve element on the opposite side from the first crankshaft, a crank arm connected to the crankshaft and a second link pivotally connected at one end to the end of the crank arm and at the other end to the piston for moving the crank arm 90° when the piston moves in one direction in the cylinder and 90° in the other direction when the piston moves in the other direction.

5. A remotely operated actuator for a drill string internal blowout preventer located in the drill string just below the swivel of a rotary drilling rig having a valve body with a flow passage through which drilling fluid flows from the swivel to the drill string and a ball shaped valve element having an opening therethrough, said valve element being positioned in the preventer body for rotation ninety degrees between an open position with the opening in the valve element in axial alignment with the flow passage through the body and a closed position with the opening positioned transverse the opening through the body, said actuator comprising an annular cylinder mounted on and surrounding the preventer body for rotating with the body with the longitudinal axis of the cylinder extending along the longitudinal axis of the preventer body, a crankshaft for rotating the valve element between said open and closed positions, said crankshaft extending laterally into the annular cylinder along the longitudinal axis of the valve element, means connecting the crankshaft to the valve element for rotation of the crankshaft to move the valve element between a first position with the opening in the valve element in alignment with the flow passage through the body and a second position with the opening in the preventer element transverse the opening in the body to close the preventer, a crank arm located in the annular cylinder and connected to the crankshaft with its longitudinal axis perpendicular to the longitudinal axis of the crankshaft, said crank arm extending at about a 45° angle above and below a horizontal plane extending through the longitudinal axis of the crankshaft when the preventer is open and closed, an annular piston in the cylinder, means for holding the piston from rotation relative to the longitudinal axis of the cylinder, a link located in the cylinder and pivotally connected at one end to the end of the crank arm and at the other end to the piston for pivoting the crank arm 90° within the cylinder when the piston moves in one direction in the cylinder and 90° within the cylinder in the other direction when the piston moves in the other direction to open and close the preventer, and means for supplying the cylinder with pressure fluid to move the piston in the one direction and the other direction.

6. The actuator of claim 5 further including non-rotating cylinder heads mounted on opposite ends of the cylinder to supply the cylinder with pressure fluid on one side of the piston while exhausting fluid from the cylinder on the other side of the piston.

7. The actuator of claim 5 in which the link is kidney-shaped.

8. The actuator of claims 5, 6, or 7 further provided with a second crankshaft located in axial alignment with the first crankshaft and connected to the valve element on the opposite side from the first crankshaft, a crank arm connected to the crankshaft and a second link pivotally connected at one end to the end of the crank arm and at the other end to the piston for moving the crank arm 90° when the piston moves in one direction in the cylinder and 90° in the other direction when the piston moves in the other direction.

* * * * *